6/6/78 OR 4,093,842

United States Patent [19] [11] 4,093,842
Scott [45] June 6, 1978

[54] PORTED ENGINE CYLINDER WITH SELECTIVELY HARDENED BORE

[75] Inventor: David I. Scott, Homewood, Ill.

[73] Assignee: General Motors Corporation, Detroit, Mich.

[21] Appl. No.: 649,969

[22] Filed: Jan. 19, 1976

[51] Int. Cl.[2] .......... B23K 9/00
[52] U.S. Cl. .......... 219/121 LM
[58] Field of Search ..... 219/121 L, 121 LM, 121 EB, 219/121 EM; 148/2, 4, 12 R, 138, 141; 204/157.1 R; 123/193 C; 29/156.4 WL

[56] References Cited

U.S. PATENT DOCUMENTS

| | | | |
|---|---|---|---|
| 2,818,359 | 12/1957 | La Belle et al. | 148/2 |
| 3,600,291 | 8/1971 | Wiley | 219/121 LM X |
| 3,632,398 | 1/1972 | Konig | 219/121 LM X |
| 3,772,496 | 11/1973 | Harendza-Harinxma | 219/121 LM |
| 3,802,927 | 4/1974 | Gomada | 148/4 |

*Primary Examiner*—J. V. Truhe
*Assistant Examiner*—Fred E. Bell
*Attorney, Agent, or Firm*—Robert J. Outland

[57] ABSTRACT

Selective laser case hardening is applied to the blended port relief area of the bore of a cast iron, water jacketed, engine cylinder liner to provide improved resistance to scuffing resulting from the rubbing contact of the walls and piston rings of an associated piston. The upper liner bore above the port relief may also be laser hardened to improve wear resistance. Case hardening of the selected area is performed by utilizing a traversed laser beam, preferably forming a single path helical pattern on the liner surface. The port relief area is preferably fully hardened by utilizing a closed helical pattern, while the upper bore may, if desired, be only partially hardened by increasing the lead of the helix to provide an open helical pattern.

4 Claims, 3 Drawing Figures

PORTED ENGINE CYLINDER WITH SELECTIVELY HARDENED BORE

This invention relates to internal combustion engines and more particularly to selective hardening of engine cylinder bores to improve resistance to scuffing and wear. In its more specific aspects, the invention relates to water jacketed cylinder liners for two-stroke cycle diesel engines having annularly disposed air inlet ports with blended port relief areas in the bores adjacent the ports and wherein non-distorting case hardening by a traversed laser beam is selectively applied to the port relief, and optionally the upper bore, areas.

It is known in the internal combustion engine art, and particularly in conjunction with two-cycle diesel engines, to utilize water jacketed cylinder liners having annularly spaced air inlet ports intermediate their ends. Such liners are commonly made from an alloy cast iron having a medium hardness, as cast, in the range of from about 200 to 260 Brinell. It is known in such liners to provide a diametrically relieved area of the bore at the ports and extending axially on either side thereof. This port relief area is smoothly curved and blended into the upper and lower liner bores and helps reduce scuffing originating in the port areas and resulting from the rubbing contact in service of the walls of an associated piston and its rings with the cylinder liner bore and port area.

Experience has shown that when scuffing does occur in such liners, its origin is most often traceable to distress at the edges of the ports, which may be carried upwardly by the piston rings to the blend line between the port relief area and the upper bore. Here the distressed condition becomes aggravated by further rubbing of the piston rings and piston skirt, so that it may eventually be spread to the upper bore area and result in scoring of the liner and piston.

It has further been recognized that wear of such cylinder liners, particularly in the upper bore area, eventually requires the cylinder liners to be replaced or reconditioned. Accordingly, it has been desired to find satisfactory means by which cylinder bore scuffing and wear may be reduced.

Various methods have in the past been tried or considered for improving one or both of these detrimental conditions. One such method is the use of chromium plating, which is widely utilized for reconditioning cylinder liner bores. In the past, however, economic factors have not generally warranted its application in the case of new cylinder liner components.

It is recognized that some engine builders have used fully hardened non-water jacketed cylinder liners or have proposed using selectively case hardened surfaces of cylinder bores formed directly in engine cylinder blocks. Applications of prior hardening procedures to the water jacketed case liners in the specific application considered here have been considered or shown to involve distortion of the liner castings which would require substantial machining after hardening, with an increase in both manufacturing cost and scrap rate. Even the application of selective induction hardening procedures in the bores of cast water jacketed liners was found to introduce excessive distortion in the machined liner castings, while failing to produce an adequate depth of hardness to reach the wear limit usually provided for the liners.

The present invention takes advantage of relatively new but commercially available methods of laser hardening to provide selective case hardening of the port relief areas and, optionally, the upper cylinder bores of ported engine cylinders, particularly of the type represented by cast water jacketed cylinder liners for two-cycle diesel engines.

It is a feature of the invention that the port relief area of the bore of a ported engine cylinder is fully case hardened by localized heating to hardening temperature by a traversed laser beam, with subsequent ambient cooling, to provide a hardened wear surface without significant distortion of the cylinder body.

It is a further feature of the invention that the hardened surface is applied in a closed helical pattern by a single pass of the laser beam. Still another feature of the invention is that the upper liner bore, above the port relief area, may also be fully or partially hardened by continuing the traversed laser beam hardening process in a single manufacturing step.

Another feature of the invention is that the upper bore may be partially hardened in an open helical pattern, having unhardened portions intermediate helical hardened portions, the hardened portions forming an open helical pattern that is an extension of the closed helical pattern of the hardened surface in the port relief area.

Selective hardening of a cylinder bore by use of the traversed laser beam process has been found to have the following advantages when applied to case ported cylinder liners of the type subsequently described.

1. It provides a fully or partially case hardened liner bore surface, without significant distortion of previously machined liner surfaces.

2. The bore material can be hardened to a measurable "apparent" hardness of 50 Rockwell C, with a minimum depth of 0.020 inches. In the process, the matrix structure is changed from 100% pearlite to 100% Martensite in the hardened areas, with the fully hardened matrix reaching a hardness of 60 to 63 Rockwell C.

3. Formation of the hardened surface in a helical pattern permits finishing of the complete hardening process in a single pass, with any combination of closed and open helical hardened areas obtained by varying the lead of the helical pattern.

These and other features and advantages of the invention will be more fully understood from the following description of certain preferred embodiments, taken together with the accompanying drawing.

Figure 1:
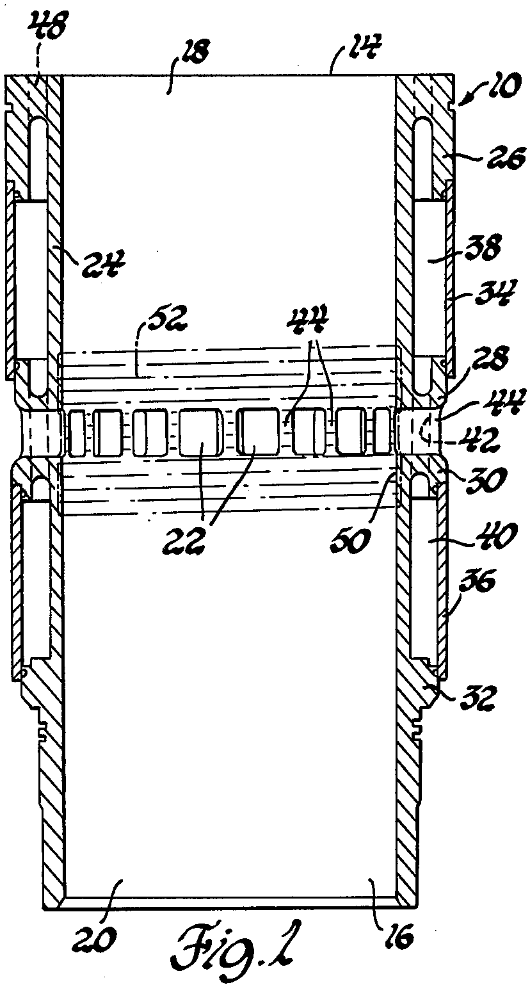
FIG. 1 is a cross-sectional view of a cast water jacketed ported cylinder liner, having the port relief portion of the bore case hardened in accordance with the invention.
Figure 2:
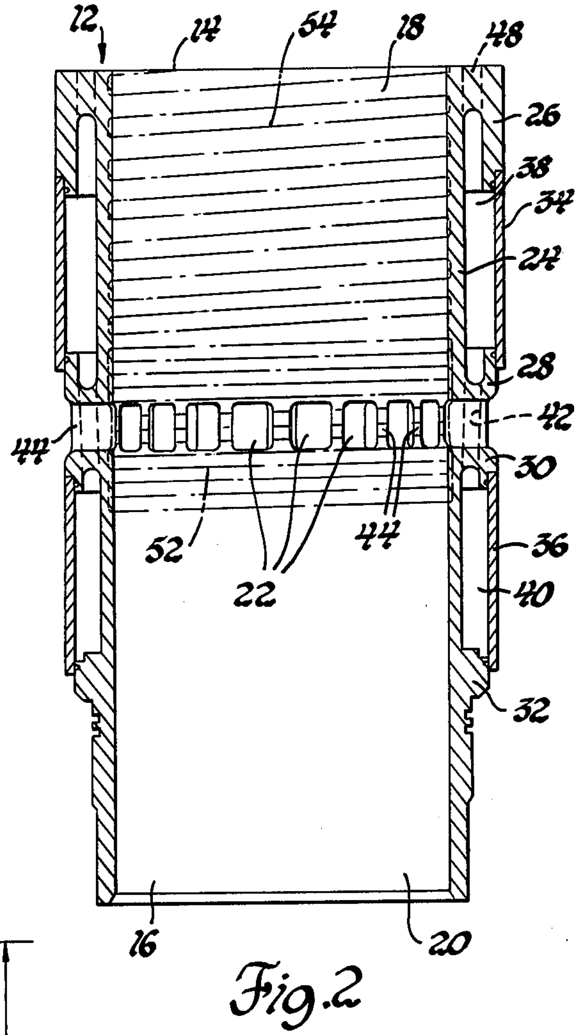
FIG. 2 is a cross-sectional view similar to FIG. 1 but showing an alternative embodiment of cylinder liner in which the selective hardening process is extended into the upper cylinder bore.

Referring first to FIGS. 1 and 2 of the drawings, there are shown removable cylinder liners 10, 12 of a type used in certain well-known two-cycle diesel engines that are used in numerous applications, including the propulsion of railway locomotives. Except for the cylinder bore hardening patterns, which will be subsequently described, the liners 10, 12 are identical in construction. Each liner includes a generally cylindrical cast iron body 14 defining internally an elongated generally cylindrical bore 16 having upper and lower bore portions 18, 20, respectively, separated intermediate the ends by an annular row of generally rectangularly spaced air inlet ports 22.

Each liner body 14 includes a generally cylindrical inner wall 24, defining the cylinder bore 16, and a plurality of flanges 26, 28, 30, 32 which extend outwardly from the inner wall and upwardly or downwardly to receive upper and lower closure sleeves 34, 36. The sleeves are brazed to the flanges and cooperate therewith to define upper and lower annular coolant jackets 38, 40 surrounding the inner walls 24 adjacent the upper and lower bore portions, respectively, of the liner. The coolant jackets 38, 40 are interconnected by cast passages 42 extending longitudinally through the columns 44 that define the inlet ports 22 and connect upper and lower body portions of the liner. An inlet opening (not shown) in the lower sleeve 36 and outlet openings 48 in the upper ends of the liner body provide for coolant flow through the lower and upper jackets.

Figure 3:
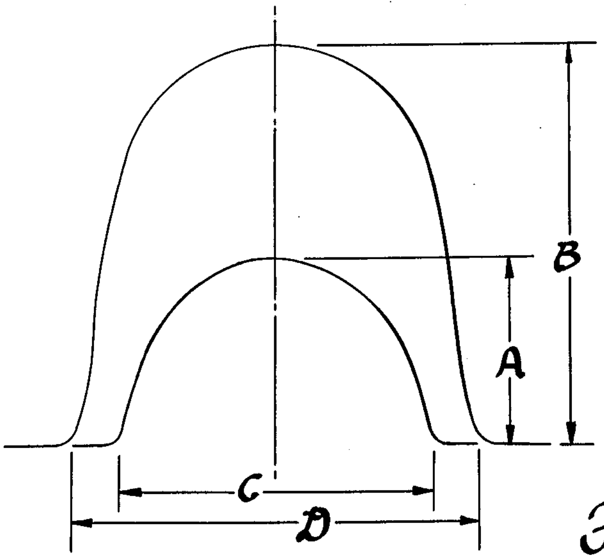
FIG. 3 is a distorted diagram of the port relief area at the illustrated liners, having the radial dimension enlarged to show the form of the port relief.

In machining of the cylindricaL bore 16, the upper and lower bore portions 18, 20 are formed with substantially constant diameters. However, the portion in and axially adjacent the port area is formed with an annular band of slightly greater inner diameter, which is smoothly blended into the upper and lower bore diameters to form a blended port relief area 50. The form of this relief is indicated by FIG. 3 in which the radial dimensions A and B represent the minimum and maximum dimensions of radial relief which are exaggerated in the drawing on a scale 500 times that of the corresponding axial minimum and maximum relief dimensions C and D. The actual amount of relief is relatively small, amounting to only 0.0045 to 0.0095 inches of radial relief for a nine inch diameter cylinder. This corresponds to a diametral relief of about 1 – 2 thousandths of the cylinder diameter. Such a port relief has been found necessary in order to obtain satisfactory operation of this type of liner and apparently offsets the tendency of the cooler port areas to expand less in operation than the adjacent upper and lower bore areas. Such differential expansion may result in scuffing and scoring of the contacting cylinder liner, piston and ring surfaces, if the port relief is not provided.

In spite of the provision of the blended port relief area and lubrication of the rubbing surfaces to the extent practical, it has been found in practice that the rubbing contact of high-strength iron pistons and piston rings of high-strength iron or steel operating in the liners sometimes results in problems with scuffing and scoring of the cylinder bores and piston and ring surfaces. It has been found that a large portion of such problems begin with distress at the edges of the cylinder ports, apparently caused from the action of the compression rings passing over them. During further operation, such distressed conditions may be enlarged by the reciprocating motion of the rings, so that the scuffed area is extended upwardly to the point where the port relief area blends with the upper liner bore. Here the distressed area is contacted by the piston skirt as it reciprocates in the cylinder, and if the condition becomes sufficiently severe, the skirt becomes abraded and enlarges the distresed condition of the cylinder bore and skirt into the upper portions of the cylinder, ultimately resulting in a scored power assembly.

The present invention aids in overcoming such piston and liner scuffing problems by providing case hardening in the blended port relief area of the cylinder bore. In practice the case hardening process is performed after the liners are fully machined, but before the final honing process which roughens the bore surfaces to provide for proper break-in of the rubbing components. It has been found that the liner bore surface may be case hardened to a depth of 20 thousandths of an inch or more through the application of commercial high intensity laser beams traversing the area to be hardened in a manner known generally in the art, but not previously known to have been applied in the manner described herein.

In the present instance, the port relief area of a cylinder liner is fully case hardened through localized heating and ambient cooling of the surface, the heating being accomplished by a traversed laser beam, which is moved along the liner surface in a combination of orbital and axial motion to form a helical pattern 52 covering the port relief area 50. To provide complete hardening of the selected area, the hardened bands formed by traversing the laser beam over the surface are edge-connected by providing a closed helix without any spaces between the hardened helical bands. With this pattern, the full surface of the port relief area may be hardened in a single pass of the laser beam across this surface.

The hardening operation, when accomplished through laser heating of the surface in a localized traverse pattern, limits heat application to the liner body to such an extent that no significant distortion of the liner body occurs during the hardening process. This is important, since if significant distortion did occur, it would be necessary to further machine the liner by grinding or to scrap the liner.

Experience has indicated that other types of hardening processes cannot satisfactorily provide a case hardened surface of the depth and quality of the laser hardening process, without substantial distortion of the cylinder liner body. For example, attempts to provide a hardened surface through traversing a specially designed induction heating coil over the liner surface proved unsatisfactory for the reasons just indicated.

In addition to reduction of scuffing and scoring problems, it is recognized that wear in the upper cylinder liner bore can be reduced and the life of the cylinder liners correspondingly extended by providing a hardened surface over the area contacted by the piston rings. This can be accomplished by the same laser hardening method used to case harden the port relief area. If necessary, the upper bore can be fully hardened, as is the port relief area. It is thought, however, that full hardening of the bore will not be required. Instead, improved performance may be obtained by only partial hardening of the upper cylinder bore in combination with full hardening of the port relief area.

Such an arrangement is shown by the hardening pattern illustrated on the liner of FIG. 2. In this arrangement the blended port relief area is fully case hardened by traversing a laser beam in a closed helical pattern 52 over that surface. The laser beam is then moved in a continuous motion into the upper bore of the cylinder liner, but in the upper bore portion the lead of the helix is increased to form an open pattern 54. Thus, in the upper bore, the surface includes a continuous hardened helical band covering half or more of the surface area, but having a space between the helical coils comprised of an unhardened helical surface area. With this pattern, the wear life of the upper bore surface is increased without increasing the manufacturing time and cost to the extent that would be necessary to fully harden the complete upper bore area.

It should be apparent that application of a traversed laser beam hardening process could be made in varying ways to a cylinder liner of the type described without departing from the broader aspects of the inventive concept disclosed. On the other hand, it is recognized that advantages of the specific arrangements and hardening patterns disclosed are sufficient to form identifiable inventions in and of themselves. In accordance with the foregoing, it is intended that the invention not be limited by the specific disclosure, but that it have the full scope permitted by the language of the following claims.

I claim:

1. The method of making a scuff resistant engine cylinder liner, said method comprising the steps of providing a coolant jacketed cast iron cylinder liner body defining a generally cylindrical interior wall with a plurality of ports through said wall and spaced annularly therearound intermediate the ends of said wall, machining finish said liner body, including the inner surface of said wall, to form approximately cylindrical upper and lower bore portions respectively above and below said ports and an annular band at and extending slightly above and below said ports of slightly greater inner diameter than that of said upper and lower bore portions and blended into said adjacent bore portions to form a blended port relief area between said bore portions, and fully case hardening only the inner surface of said blended port relief area through localized heating to hardening temperature by traversing a laser beam across said inner surface and subsequent ambient cooling such that a scuff resistant hardened surface is provided in said port relief area without significant distortion of said cast iron cylinder liner body and its previously machined surfaces.

2. The method of claim 1 wherein said case hardening step is extended to include the partial case hardening of said machined upper bore portion, to provide a wear resistant hardened surface therein.

3. The method of claim 2 wherein said case hardening step includes traversing said laser beam in a closed helical pattern over the port relief area and in an open helical pattern over the upper bore portion so as to form a continuous hardened surface in the port relief area and an intermittently hardened surface of adjacent helical bands of hardened and unhardened areas in the upper bore portion.

4. The method of claim 1 wherein said case hardening step is accomplished by traversing the laser beam over the liner surface in a single pass helical pattern of varying lead.

* * * * *

UNITED STATES PATENT AND TRADEMARK OFFICE

CERTIFICATE OF CORRECTION

PATENT NO. : 4,093,842

DATED : June 6, 1978

INVENTOR(S) : David I. Scott

It is certified that error appears in the above–identified patent and that said Letters Patent are hereby corrected as shown below:

Column 3, line 21, "cylindricaL" should read --cylindrical--.

Column 5, line 23, "machining finish" should read --finish machining--.

Column 6, line 24, "claim 1" should read --claim 3--.

Signed and Sealed this

***Fourteenth* Day of *November 1978***

[SEAL]

*Attest:*

RUTH C. MASON
*Attesting Officer*

DONALD W. BANNER
*Commissioner of Patents and Trademarks*